United States Patent [19]

Asano et al.

[11] Patent Number: 4,713,293
[45] Date of Patent: Dec. 15, 1987

[54] MAGNETIC RECORDING MEDIA

[75] Inventors: Masao Asano; Ryosuke Isobe; Yasuhisa Yamauchi; Hiroaki Yamagishi, all of Hino, Japan

[73] Assignee: Konishiroku Photo Industry Co., Ltd., Tokyo, Japan

[21] Appl. No.: 760,406

[22] Filed: Jul. 30, 1985

[30] Foreign Application Priority Data

Aug. 7, 1984 [JP] Japan .................................. 59-166280

[51] Int. Cl.$^4$ ............................................ G11B 5/712
[52] U.S. Cl. .................................. 428/403; 252/62.54; 427/131; 428/328; 428/329; 428/407; 428/425.9; 428/522; 428/526; 428/694; 428/695; 428/900
[58] Field of Search ............... 428/694, 328, 329, 331, 428/695, 407, 403, 900, 425.9, 322, 526; 427/131, 132; 252/62.54; 360/134-135

[56] References Cited

U.S. PATENT DOCUMENTS

| | | | |
|---|---|---|---|
| 4,091,143 | 5/1978 | Hartman | 428/328 |
| 4,361,621 | 11/1982 | Isobe | 428/694 |
| 4,404,253 | 9/1983 | Kohler | 428/694 |
| 4,404,260 | 9/1983 | Shibata | 428/694 |
| 4,407,901 | 10/1983 | Miyatsuka | 428/694 |
| 4,420,537 | 12/1983 | Hayama | 428/694 |
| 4,465,737 | 8/1984 | Miyatuka | 428/339 |
| 4,562,117 | 12/1985 | Kikukawa | 428/900 |
| 4,568,619 | 2/1986 | Hiller | 428/694 |

Primary Examiner—Ellis P. Robinson
Attorney, Agent, or Firm—Jordan B. Bierman

[57] ABSTRACT

A magnetic recording medium comprising a magnetic layer containing a magnetic metal powder, a fatty acid and an ester thereof, and wherein the surface of said magnetic metal powder is pre-treated with a surfactant.

13 Claims, No Drawings

MAGNETIC RECORDING MEDIA

BACKGROUND OF THE INVENTION

The present invention relates to the magnetic recording media such as video-tapes, audiotapes and others, and particularly to the improvement of the performance of the magnetic recording media such as running stability, still life and others.

Generally, the magnetic recording media are manufactured through the method wherein magnetic coatings containing a magnetic powder, a binder and others are coated on a support and then dried, Recently, the development of the magnetic recording media has requested a high-grade tape performance for the magnetic tapes for the use of video, computer, audio and others. A still life and a stable running property are especially required for the video-tape whose relative speed is high. Therefore, it is very important to reduce the running friction of the tape as well as the abrasion resistance of the tape itself.

For the purpose of reducing the friction of the magnetic layer, adding of various types of lubricants (i.e. silicone oil, graphite, carbon black graft polymer, molybdenum disulfide, tungsten disulfide, lauric acid, myristic acid and fatty acid ester consisting of monohydric alcohol having 21~23 carbon atoms that represent a total of monobasic fatty acid having 12~16 carbon atoms and the number of carbon atoms of the fatty acid) has hitherto been known. Despite an addition of foregoing lubricants, however, no satisfactory charcteristics have so far been obtained and it has been impossible to avoid undesirable phenomena such as blooming and other, in particular.

Head-clogging or head-deterioration has hitherto been prevented by the so-called head cleaning action wherein a magnetic layer is reinforced by the use of fine powder abrasives and moderate roughness is given to the surfaces of the magnetic layer and thereby foreign materials piled up on the head are removed.

For example, Japanese Paten Examined Publication No. 39402/1974 discloses that the combination of a fatty acid having the melting point (hereinafter referred to as mp) of 50° C. and below and the abrasives having the particle size of 5 μm and less and the Mohs' hardness of 6 and over improves the still life remarkably compared with the case wherein neither fatty acid nor abrasives are contained.

As observed in Japanese Patent Examined Publication No. 39081/1976 and Japanese Patent Publication Open to Public Inspection No. 130435/1983, on the other hand, there have been suggested the technologies to cause fatty acid ester having an RCO group with the number of carbon atoms of from 10 to 16 and a fatty acid having the mp of from 44° to 70° C. to be contained in the magnetic layer. The combined use of these fatty acid ester and a fatty acid is considered to prevent the aforesaid phenomena. Namely, although it is generally known that fatty acid ester itself reduces the friction by reducing surface free energy, if the mp of the fatty acid ester is 20° C. and below, the blooming takes place at room temperature and on the occasion especially of tne storage under high temperature and high humidity and the stickiness is produced, thereby the running property is deteriorated.

Further, the mixture ratio of fatty acids and fatty ester both have hitherto been used for lubricants and the amount thereof have been adjusted so that they accord with magnetic materials in the iron oxide group. Therefore, when the surface properties like the metal powder that differ from the oxide powder are owned, the desirable performance has not yet been achieved and the conventional ratio of acid and ester has caused the running property to be unstable.

SUMMARY OF THE INVENTION

In view of the situation mentioned above and in magnetic recording media wherein a ferromagnetic metal powder is employed, it is an object of the present invention to provide magnetic recording media excellent in the dispersibility of the ferromagnetic metal powder.

Another object of the invention is to provide magnetic recording media excellent in its stable running property.

A further object of the invention is to provide magnetic recording media excellent in its still life.

Yet another object of the invention is to provide magnetic recording media having a small coefficient of friction.

A still further object of the invention is to provide magnetic recording media excellent in its video characteristics.

An additional object of the invention is to provide magnetic recording media on which no head-clogging takes place.

Another object of the invention is to provide magnetic recording media which satisfy at least two purposes mentioned above, especially the magnetic recording media which satisfy aforesaid all purposes.

Aforesaid objects of the present invention may be accomplished by the magnetic recording media comprising a magnetic layer coated on the non-magnetic support of the magnetic recording medium and containing ferromagnetic metal powder whose particle surface is treated by a surface-treating agent and a binder, wherein the magnetic layer contains both fatty acid and fatty acid ester amounting together to 1.5~7.5% by weight of ferromagnetic powder and a mixture ratio of fatty acid is greater than 85% by weight of the total of the fatty acid and fatty acid ester.

Incidentally, the surface treatment in the present invention means the treatment wherein the dispersibility that suspends stably against the magnetic powder is given to the magnetic powder by means of the substance having the surface adsorptivity or the substance capable of forming an adhered thin film.

As described above, the magnetic recording media of the present invention are excellent in their dispersibility, stable running property, video characteristics, still life and others.

DETAILED DESCRIPTION OF THE INVENTION

As a fatty acid to be used in the present invention, an unsaturated fatty acid such as stearic acid, lauric acid, caprylic acid and capric acid as well as a fatty acid wherein a alkyl group has a side chain are used and the ones whose mp is 50° C. and over such as myristic acid, palmitic acid, behenic acid and others are desirable. Other types of fatty acids may further be added to aforesaid one type of fatty acid. Examples thereof include myristic acid-palmitic acid (80/20) 2-types mixture type and oleic acid-myristic acid-palmitic acid (5/90/5) 3-types mixture type.

When fatty acid ester related to the present invention is expressed in a general formula RCOOR', R and R' in the formula represent an alkyl group that may possess a substituent. It is desirable that the number of carbon atoms for R is 16 and over and it is further desirable that the number is 20 and less from the viewpoint of solvent solubility. For R' on the other hand, the number of carbon atoms is from 1 to 10.

As aforesaid fatty acid ester, caproic acid butyl, caprylic acid butyl, lauric acid butyl, myristic acid butyl, palmitic acid butyl, palmitic acid ethyl and others are given, for example, and stearic acid ester among them is preferable and esters such as methyl, ethyl, propyl, butyl, amyl, butoxy ethyl and others are given.

In a fatty acid and fatty acid ester both related to the present invention, the ratio by weight of the fatty acid to the sum of the fatty acid plus fatty acid ester is 85/15~99/1 and it preferably is 85/15~95/5.

When the fatty acid content is lower than 85% by weight, the video characteristics and surface property deteriorate. When nothing but fatty acid is contained, the still life is short.

The total amount of both fatty acid and fatty acid ester to be added is from 1.5% to 7.5% by weight of metallic magnetic powder and it preferably is from 2% to 6% by weight. If it exceeds 7.5% by weight, a film becomes soft and the still life and running property deteriorate.

As a surface-treating agent to be used in the present invention, lecithin, phosphoric acid ester, amine compounds, alkyl sulfate, fatty acid amide, higher alcohol, polyethylene oxide, sulfosuccinic acid, sulfosuccinate, known surface active agents and others and salts thereof are given and further, salts of polymer dispersant having a negative group (e.g. —COOH, —PO$_3$H), silicon compounds and various polymers such as polyamide, epoxy resin and others are given and copolymers represented by the following general formula are especially useful;

General Formula

where, the structural element of A is a negative organic group-containing monomer (hereinafter called a monomer unit A) and the negative organic group includes, for example, carboxyl group, phosphoric acid residue, sulfonic acid residue and others and carboxyl group and phosphoric acid residue among them are desirable and as a salt thereof, there are given an ammonium salt, alkaline metallic salt and others wherein an ammonium salt is desirable. As a monomer unit A, there are given, for example, acrylic acid, methacrylic acid, maleic anhydride, 2-hydroxyethylacryloylphosphate and others wherein acrylic acid and maleic anhydride are desirable.

As aforesaid negative organic group, a carboxyl group and phosphoric acid residue are desirable. The reasons why acrylic acid and maleic anhydride are desirable as a monomer unit A are because they are excellent in their preservability and dispersibility.

As such monomer unit A, there are given the ones having the following formula.

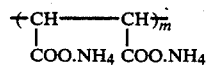
(1)

(This unit may be formed with maleic anhydride as a starting material under an action of ammonia. The repetition unit is shown with m: the same shall apply hereinafter.)

(2)

(3)

As an ammonium salt, it is possible to apply the ones formulated in the following formula containing aforesaid —COO$^-$N$^+$H$_4$:

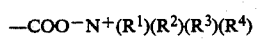

(however, R$^1$, R$^2$, R$^3$ and R$^4$ are hydrogen atoms respectively or are lower alkyl groups which are the same or different each other.)

When aforesaid R$^1$, R$^2$, R$^3$ and R$^4$ are lower alkyl groups, it is desirable that the total number of carbon atoms for R$^1$~R$^4$ is not more than 6 because it does not take place that the basicity of ammonium salt is lost by the steric hindrance.

As B (hereinafter called a monomer unit B), on the other hand, there are given styrene and styrene derivative such as styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene, 3,4-dichlorostyrene and others. As vinyl group monomers other than for foregoing, there may be given, for example, ethylene unsaturated monoolefins such as ethylene, propylene, butylene, isobutylene, diisobutylene, isononene, isododecene and others; vinyl halides such as vinyl chloride, vinylidene chloride, vinyl bromide, vinyl fluoride and others; vinyl esters such as vinyl acetate, vinyl propionate, vinyl benzoate, vinyl butyrate and others; α-aliphatic methylene monocarbonate such as methyl acrylate, ethyl acrylate, n-butyl acrylate, isobutyl acrylate, propyl acrylate, n-octyl acrylate, dodecyl acrylate, 2-ethylhexyl acrylate, stearyl acrylate, 2-chloroethyl acrylate, phenyl acrylate, α-chloromethyl acrylate, methyl methacrylate, ethyl methacrylate, propyl methacrylate, n-butyl methacrylate, isobutyl methacrylate, n-octyl methacrylate, dodecyl methacrylate, 2-ethylnexyl methacrylate, stearyl methacrylate, phenyl methacrylate, drmethylaminoethyl methacrylate, diethylaminoethyl methacrylate and others derivatives of acrylic acid or of methacrylic acid such as acrylonitrile, methacrylonitrile, acrylamide and others; vinyl ethers such as vinyl methylether, vinyl ethylether, vinyl isobutylether and others; vinyl ketones such as vinylmethylketon, vinylhexylketone, methylisopropenylketone and others, N-vinyl compounds such as N-vinylpyrrole, N-vinylcarbazole, N-vinylindole, N-vinylpyrolidone and others and vinylnapthalenes.

Further, each of m and n is a positive real number. The average value of (m+n) is not more than 100 and it preferably is 50 and less. If it exceeds 100, a uniform dispersion is hard to be expected in the magnetic layer of a magnetic recording medium and thereby the performance (e.g. output) of the recording medium tends to be partially uneven, which is not desirable. Furthermore, it is especially preferable that (m+n) is not more than 30. In such a case, the dispersion effect is especially excellent and the performance of the magnetic recording medium of the present invention is improved remarkably in particular. Incidentally, it is preferable that the average value of (m+n) is not less than 4 from the viewpoint of the prevention of blooming phenomena.

Now, it is possible to pertinently control both characteristics of hydrophile property and lipophilic (hydrophobic) property of copolymers, namely the HLB (Hydrophile Lipophile Balance) through the selection of the values of m and n and the selection of the kind of a salt of organic group in a unit A.

As a desirable surface-treating agent other than the foregoing, there are given the ones formulated with the following general formula, for example;

General Formula $$R_1NH(CH_2)_{n'}NH_2 \cdot (R_2COOH)_2$$

wherein, each of $R_1$ and $R_2$ is an alkyl group, an alkenyl group or an allyl group each having 6 or more carbon atoms and n' represents an integer ranging from 1 to 10. For example, following compounds are given.

(Exemplified compounds)
(1) $C_6H_{13}NH(CH_2)_3NH_2 \cdot (C_6H_{13}COOH)_2$
(2) $C_8H_{17}NH(CH_2)_3NH_2 \cdot C_8H_{17}COOH)_2$
(3) $C_{10}H_{21}NH(CH_2)_3NH_2 \cdot (C_{10}H_{21}COOH)_2$
(4) $C_{14}H_{20}NH(CH_2)_4NH_2 \cdot (C_{17}H_{33}COOH)_2$
(5) $C_{18}H_{35}NH(CH_2)_3NH_2 \cdot (C_{17}H_{33}COOH)_2$
(6) $C_{18}H_{37}NH(CH_2)_3NH_2 \cdot (C_{17}H_{33}COOH)_2$
(7) $C_{20}H_{41}NH(CH_2)_4NH_2 \cdot (C_{20}H_{41}COOH)_2$
(8) $C_{18}H_{35}NH(CH_2)_4NH_2 \cdot C_{17}H_{33}COOH)_2$
(9) $C_{18}H_{37}NH(CH_2)_4NH_2 \cdot (C_{17}H_{33}COOH)_2$
(10) $C_{20}H_{41}NH(CH_2)_6NH_2 \cdot (C_{20}H_{41}COOH)_2$

(11) 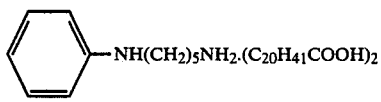—$NH(CH_2)_5NH_2 \cdot (C_{20}H_{41}COOH)_2$

Aforesaid compounds are easily available in the market usually under the product name (made by Lion Company) of 'Duomeen TDO'.

An amount of surface-treating agent to be used is 0.1~10% by weight of the metallic magnetic powder and the range from 0.5 to 5% by weight is more preferable.

In the aforesaid surface-treatment, magnetic powder is added to the surface-treating agent solution wherein surface-treating agent is dissolved in other solvent, then the solution is stirred for dispersion of the ingredients thereof, thereby the surface of each particle of the powder is fully covered by the adsorption layer or the deposited thin film layer of the surface-treating agent and after that the powder is separated and dried or mixed with other element liquid for the utilization. In the aforesaid process, so-called deoxidization process for stabilizing the metallic magnetic powder may be provided, For example, after aforesaid surface-treatment, the magnetic powder is dipped in the organic substance in liquid state, thereby aforesaid surfactant is fully deposited and retained on the surface of magnetic powder particle, then the treated surface is cleaned and aforesaid dispersibility is highly maintained. After this dipping, the magnetic powder is dried while it is contacted to oxidizing gas (e.g. air) and thereby the surface of each particle of the magnetic powder is slightly oxidized. This oxidization effectively eliminates active sites such as iron or the like on the surface of magnetic powder, thus it can stabilize the surface.

Further, as a desirable embodiment of the present invention, if metallic magnetic powder is dipped in the surfactant-containing solution under the inactive atmosphere and stirred for the surface treatment and then dried under reduced pressure and after that, if aforesaid magnetic powder is dipped in organic substance in liquid state, then stirred and dried while being contacted with gas containing oxygen and while the solvent is being volatilized, it is possible to deoxideize successfully.

As magnetic metallic powder, especially as ferromagnetic metallic powder to be used in the present invention, various types of ferromagnetic powder including metallic magnetic powder and others whose principal components are Fe, Ni, Co and others such as Fe, Ni, Co, Fe-Ni-Co alloy, Fe-Mn-Zn alloy, Fe-Al, Fe-Ni-Zn alloy, Fe-Co-Ni-Cr alloy, Fe-Co-Ni-P alloy, Co-Ni alloy and others are given and a specific surface area of those ferromagnetic powder to be used is 25~70 $m^2/g$.

In magnetic recording media of the present invention, polyurethane which especially has a high abrasion resistance is used as a binder that combines magnetic powder and forms a magnetic layer. This polyurethane has a high adhesive strength for other substances and resists the stresses or the bending both applied repeatedly, thus it is mechanically strong and is both abrasion-resistant and wheather proof.

Further, it is desirable that soft type polyurethane having a tensile strength not more than 200 kg/cm² and hard type polyurethane with a tensile strength exceeding 200 kg/cm³ are jointly used. Further, it is preferable that both types of aforesaid polyurethane have a rupture elongation of 900% and over.

Regarding the binder, if cellulose resin, phenoxy resin, polyester resin, epoxy resin and vinyl chloride copolymer are contained therein in addition to polyurethane, the dispersibility of magnetic powder in the magnetic layer may be improved and its mechanical strength is increased accordingly. However, if cellulose resin and vinyl chloride copolymer only are contained, the layer becomes too hard, which may be avoided by the containing of polyurethane.

Aforesaid polyurethane may be synthesized through the reaction of polyol and polyisocyanate. As a usable polyol, there may be enumerated polyester polyol synthesized through the reaction of organic dibasic acid such as phthalic acid, adipic acid, dimerized linolenic acid, maliec acid and others with glycols such as ethylene glycol, propylene glycol, butylene glycol, diethylene glycol and others or with polyhydric alcohols such as trimethylolpropane, hexanetoluole, glycerol, trimethylolethane, pentaerythritol and others or with polyols of any two kinds or more selected from aforesaid glycols and polyhydric alcohols; lactone polyester polyol synthesized from lactams such as s-caprolactam, a-methyl-1-caprolactam, s-methyl-s-caprolactam, γ-butyrolactam and others; or polyether polyol synthesized from ethylene oxide; propylene oxide, butylene oxide and others.

Aforesaid polyols are caused to react with isocyanate compounds such as tolylenediisocyanate, hexamethylene diisocyanate, methylene diisocyanate, metaxylilene diisocyanate and others and thereby urethanated polyesterpolyurethane, polyetherpolyurethane and polycarbonate polyurethane carbonated by phosgene or by diphenyl carbonate are synthesized.

Aforesaid polyurethanes are usually produced mainly through the reaction of polyisocyanate with polyol and they may be in the form of urethane resin containing free isocyanate group and/or hydroxyl group or of urethane prepolymer or in the form of the foregoing containing no reactive terminal group (e.g. the form of urethane elastomer).

Incidentally, if the binder related to the present invention contains both aforesaid polyurethane and cellulose resin and/or vinyl chloride copolymer, the dispersibility of magnetic powder may, when the binder is applied to the magnetic layer, be improved and its mechanical strength is increased. However, only cellulose resin and/or vinyl chloride copolymer contained will cause the layer to be too hard, which may be prevented by containing polyurethane.

As a usuable cellulose resin, cellulose ether, cellulose inorganic acid ester, cellulose organic ester and others may be used. Cellulose ethers which may be used include methyl cellulose, ethyl cellulose, propyl cellulose, isopropyl cellulose, butyl cellulose, methylethyl cellulose, methylhydroxyethyl cellulose, ethylhydroxyethyl cellulose, carboxymethyl cellulose, carboxymethyl cellulose sodium salt, hydroxyethyl cellulose, benzyl cellulose, cyanoethyl cellulose, vinyl cellulose, nitrocarboxymethyl cellulose, diethylaminoethyl cellulose, aminoethyl cellulose and others. a cellulose inorganic acid ester, nitrocellulose, cellulose sulfate, cellulose phosphate and others may be used. Further, cellulose organic acid esters whicn may be used include acetyl cellulose, propionyl cellulose, butyryl cellulose, methacryloyl cellulose, chloroacetyl cellulose, $\beta$-oxypropionyl cellulose, benzoyl cellulose, p-toluenesulfonic acid cellulose, acetylpropionyl cellulose, acetylbutyryl cellulose and others. Nitrocellulose is preferable among aforesaid cellulose resins. As an actual example of nitrocellulose, there may be enumerated Cellunova BTH ½ and Nitrocellulose SL-1 both made by Asahi Chemical Industry co., Ltd. and Nitrocellulose RS ½ and Celluline L-200 both made by Daicel Ltd. It is desirable that the viscosity {the viscosity stipulated in JIS, K-6703 (1975)} of nitrocellulose is 2~1/64 sec and especially, the ones having the viscosity of 1~¼ sec are excellent. The viscosity which is out of aforesaid range will cause the magnetic layer to be insufficient in its stickiness and strength.

Phenoxy resins capable of being used are of the polymers obtained in a polymerization of bisphenol A and an epichlorohydrin, and more suitably those having the basic structure represented by the following formula. In the structure, it is also allowed to introduce further a variety of substituents;

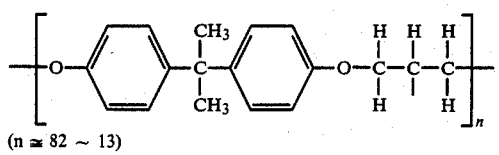

(n ≈ 82 ~ 13)

For example, they include PKHC, PKHH, PKHT each manufactured oy Union Carbide and the like, and, YP-50 manufactured by Tohto Kasei Co., and the like.

Further, as a usable vinyl chloride copolymer mentioned above, there may be given the ones formulated by the following general formula.

General Formula:

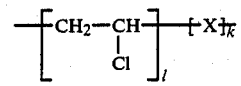

In this case, the mole ratio derived from l and k in the following formula is 95~50 mole % for the former unit and 5~50 mol % for the latter unit.

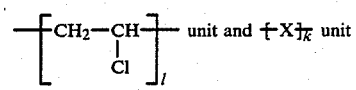

X, on the other hand, represents a monomer residue that can be copolymerized with vinyl chloride and further represents at least one kind selected from the group consisting of vinyl acetate, vinyl alcohol, maleic anhydride, maleic anhydride ester, maleic acid, maleic acid ester, vinylidene chloride, acrylonitrile, acrylic acid, acrylic acid ester, methacrylic acid, methacrylic acid ester, vinyl propionate, glycidyl methacrylate and glycidyl acrylate. The degree of polymerization indicated as (l+k) is preferably 100~600 and if the degree of polymerization is less than 100, the magnetic layer tends to be adhesive and if it exceeds 600, the dispersibility will be deteriorated. Aforesaid vinyl chloride copolymer may partially be hydrolyzed. Copolymer containing vinyl chloride - vinyl acetate (hereinafter referred to as 'vinyl chloride - vinyl acetate copolymer') is preferable as a vinyl chloride copolymer. An example of vinyl cnloride - vinyl acetate copolymer includes copolymers such as vinyl chloride-vinyl acetate - vinyl alcohol, vinyl chloride - vinyl acetate - maleic anhydride, vinyl chloride - vinyl acetate - vinyl alcohol - maleic anhydride and vinyl chloride - vinyl acetate - vinyl alcohol - maleic anhydride - maleic acid and copolymers partially hydrolyzed are preferable among vinyl chloride - vinyl acetate copolymers. Actual examples of aforesaid vinyl chloride - vinyl acetate copolymer which may be used include 'VAGH', 'VYHH' and 'VMCH' each manufactured by Union Carbide Corp., 'Eslec M' made by Sekisui Chemical Co., Ltd. and 'Denka Vinyl 1000G' an 'Denka Vinyl 100W' both manufactured by Denki Kagaku Kogyo K.K.

Aforesaid vinyl chloride copolymer and cellulose resin may be used under any mixture ratio thereof.

Further, with regard to the entire composition of the binder, it has been confirmed that the ration by weight of polyurethane to other resin (total amount of cellulose resin and vinyl chloride copolymer) is preferably 90/10~50/50 and 85/15~60/40 is more preferable. If the amount of polyurethane is too much exceeding aforesaid range, the insufficient dispersion tends to take place and thereby the still life tends to be deteriorated and if the amount of other resin is too much, the surface property tends to be defective and the still life property becomes worse and especially when the amount of other resin exceeds 60% by weight, the physical properties of the film becomes undesirable when they are considered from a synthetic viewpoint.

Further, the binder to be used in the present invention includes polycarbonate-polyurethane resin (hereinafter abbriviated as polycarbonate-urethane) formulated in the following general formula:

General Formula [I]

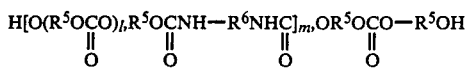

where, $R^5$ and $R^6$ represent oliphatic or aromatic hydrocarbon group and $l'$ represents values not more than 50 and it preferably $1 \sim 30$ from the viewpoints of the transition temperature of glass Tg and of the stickiness. The symbol $m'$ represents the values of $5 \sim 500$ and it preferably is $10 \sim 300$ from the viewpoints of the film-forming property and of the solubility for solvent. Further, $l'$ and $m'$ are selected so that the average molecular weight may stay within the range fro 50,000 to 200,000.

Aforesaid polycarbonate-urethane contributes, owing to the existence of carbonate ingredients, to the improvement of the heat resistance (Tg) in addition to the abrasion resistance which is peculiarly caused by urethane resin and also the solubility for solvent is improved and the film strength may be enhanced by increasing the urethane concentration. Moreover, unlike the conventional binder fundamentally, having no ester bond in the molecule, no scratch on the layer or no film-peeling takes place even for a long time usage under the conditions of high temperature and high humidity, thus the property of smooth running may be maintained. This is attributed to aforesaid polycarbonate-urethane that is excellent in moisture resistance and shows a low stickiness and thus assures a fully stable running property.

Further, aforesaid polycarbonate-urethane is excellent in its compatibility with other polymers (e.g. vinyl chloride - vinyl acetate resin, nitrocellulose) used jointly to enhance the film strength and the dispersibility of magnetic powder etc. and therefore the physical properties of the film do not change easily and thereby the running property of the medium obtained may be improved. Further, it is possible to present skewing on the reproduced image or improve the still life characteristics by correcting the curling of the tape through the adjustment of the amount of isocyanate to be added and through the addition of polyols other than polycarbonate polyols.

Further, sulfone denatured polyester and polycarbonate urethane are compatible each other and give an excellent binder composition without degrading respective merits each other.

As a binder for the magnetic layer related to the present invention, the mixture of aforesaid binder and thermoplastic resin, thermosetting resin, reactive resin or electron beam-irradiation-setting resin may be used. Examples of thermoplastic resins include the ones having a softening point of not more than 150° C., an average molecular weight of $10,000 \sim 200,000$ and a degree of polymerization of about $200 \sim 2,000$ such as polyester resins.

An example of thermosetting resin or reactive resin is an epoxy resin or the like which has a molecular weight of not ore than 200,000 in the state of coating liquid and has a molecular weight of infinity caused by the reactions of condensation, addition and others which take place after coating and drying. Among these resins, the one which is neither softened nor melted until the heat decomposition of the resin is preferable.

As an electron beam-irradiation-setting resin, an unsaturated prepolymer or a multifunctional monomer may be given.

The mixing ratio of ferromagnetic powder to the binder to be employed in the present invention is in the range of $5 \sim 400$ parts by weight of the binder per 100 parts by weight of aforesaid ferromagnetic powder and it preferably is in the range of $10 \sim 200$ parts by weight. When the binder is too much in the amount, the recording density of the magnetic recording medium containing the binder is deteriorated and when the amount of the binder is too small, undesirable results such as the deterioration of the strength of magnetic layer, the deterioration of the durability and powder-falling are caused.

Further, in order to improve the durability of the magnetic recording medium, it is possible to cause the magnetic layer to contain various hardening agents one example of which is isocyanate.

Usable aromatic isocyanate include, for example, tolylene diisocyanate (TDI), 4,4-diphenylmethanediisocyanate (MDI), xylylenediisocyanate (XDI), methaxylylenediisocyanate (MXDI) and adducts of aforesaid isocyanate and active hydrogen compound and the ones having the range of $100 \sim 3,000$ as an average molecular weight are preferable.

Concretely, Sumidur-T80, -44S. -PF, -L, Desmodur-T65, -15, -R, -RF, -IL, -SL all made by Sumitomo Bayer Urethane Company Takenate-300S, 500 both made by Takeda Chemical Industries, Ltd.; 'NDI', 'TODI' both made by Mitsui Nisso Urethane Company Desmodur-T100, Milionate-MR. -MT, Colonate-L all made by Nihon polyurethane company and PAPI-135, TD165, -80, -100, Isonate 125M, -143 L all made by Kasei Up Jhon Comapany are given as an actual sample.

As an aliphatic isocyanate, on the other hand, it is possible to enumerate hexamethylene diisocyanate (HMDI), lysineisocyanate, trimethylhexamethylene diisocyanate (TMDI) and adducts of aforesaid isocyanate and active hydrogen compound. Among these aliphatic isocyanates and adducts of the isocyanate and active hydrogen compound, the ones having the molecular weight in the range of $100 \sim 3,000$ are preferable. Among aliphatic isocyanates, on the other hand, non-alicyclic isocyanates and adducts of aforesaid isocyanate compounds and active hydrogen compounds are preferable.

Concretely. Sumidur-N, Desmodur-Z4273 both made by Sumitomo Bayer Urethane Company, Duranate-50M, -24A-100, -24A-90CX all made by Asahi Chemical Industry Co., Ltd., Colonate-HL made by Nihon Polyurethane company and TMDI made by Huls Company are available. Further, as an alicyclic isocyanate among aliphatic isocyanates, it is possible to enumerate, for example, methylcyclohexane-2,4-diisocyanate,

[structural formula: 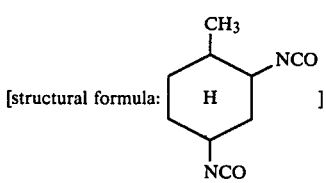 ]

4,4'-methylenebis (cyclohexylisocyanate),

[structural formula: 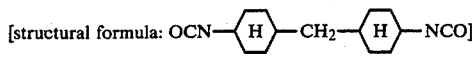]

isophorone diisocyanate and an adduct of the isophorone diisocyanate and active hydrogen compound.

Actually, 'IPDI', IPDI-TI890, -H2921and -B1065all made by CHEMISCHE WERKE HÜLS AG. are available.

Magnetic recording media are prepared in a way wherein magnetic powder, binder and various types of additives, for example, are mixed with organic solvent and dispersed for the preparation of magnetic coating which is coated, after the addition of aforesaid aromatic isocyanate and/or aliphatic isocyanate thereto, on the support (e.g. polyester film) and dried when necessary.

To maintain the physical properties of magnetic coating so that the coating can easily be coated and to improve the physical proerties of the magnetic layer to be formed, it is preferable to use both aromatic isocyanate and aliphatic isocyanate in combination.

The amount of isocyanate to be added is 1~100%, by weight against the binder. If the amount is less than 1%, hardening of the magnetic layer tends to be insufficient and if it is higher than 100%, the magnetic layer tends to be sticky although it is hardened. The amount of isocyanate to be added which is 5~30% by weight against the binder provides more preferable magnetic layer.

The coating to be used for forming aforesaid magnetic layer may contain, when necessary, some additives such as dispersing agents, lubricants, abrasives, other antistatic agents and others.

As a usable dispersing agent, fatty acid having 8~18 carbon atoms (R in R—COOH represents saturated or unsaturated alkyl group having 7~17 carbon atoms) such as soybean lecithin, lecithin containing no soybean oil, caprylic acid, capric acid, lauric acid, myristic acid, palmitic acid, stearic acid, oleic acid, eladic acid, linolic acid, linolenic acid and others and metal soap consisting of alkali metal (Li, Na, K etc.) of aforesaid fatty acid or of alkaline earth metal (Mg. Ca, Ba etc.) of aforesaid fatty acid are enumerated. In addition to the foregoing, higher alcohol having carbon atoms of 12 and over may be used and sulfate may further be used. Further, general surfactant on the market can also be used. These dispersing agents may be used either independently or in combination of 2 kinds and over. As a lubricant. silicone oil. graphite, molybdenum disulfide, tungsten disulfide, fatty acid ester consisting of univalent alcohol having 21~23 carbon atoms which is a total of 12~16 carbon atoms of monobasic fatty acid and the number of carbon atoms of the fatty acid and others may be used. These lubricants are to be added in the range of 0.2~20 parts by weight per 100 parts by weignt of magnetic powder.

As usable abrasives. materials generally used such as fused alumina, silicon carbide, chromium oxide, corundum, artificial corundum, diamond, artificial diamond, garnet, emery (principal ingredients: corundum and magnetite) and others are used. An average particle size of these abrasives is 0.5~5µand especially preferable size is 1~20 µ. The amount of these abrasives to be added is 1~20 parts by weight per 100 parts by weight of magnetic powder.

As usable antistatic agents, there may be enumerated conductive powder such as carbon black, graphite, tin oxide-antimony oxide compound or titanium oxide - tin oxide - antimony oxide compound; natural surfactant such as saponin or the like; nonionic surfactant such as of alkylene oxide, glycerin or of glycidol; cationic surfactant such as higher alkylamine, quaternary ammonium salt, pyridine, other heterocycles, phosphoniums or sulfoniums; anionic surfactant containing acid group such as carboxylic acid, sulfonic acid, phosphoric acid, ester sulfate group, ester phosphate group and others and amphoteric active agent such as amino acids, aminosulfonic acids, ester sulfate of aminoalcohol or ester phosphate of aminoalcohol.

Solvent for magnetic coating or solvent to be used when coating the magnetic coating may be aforesaid acetone, methylethyl ketone or the like.

Further, as a material for the support, polyesters such as polyethyleneterephthalate, polyethylene-2,6-naphthalate and others, polyoleffins such as polypropylene or the like, cellulose derivatives such as cellulose triacetate, cellulose diacetate and others, plastics such as polycarbonate or the like, metal such as aluminum, zinc and others and ceramics such as glass-nitrified boron, silicon carbide, porcelain, earthenware and others are used.

The thickness of the support is about 3~100 µm, preferably is 5~50 µm for film or sheet type supports and it is 30 µm~10 mm for disc or card type supports. In the case of a drum type support, it is to be cylindrical form and its type is to be decided according to the recorder to be used.

It is preferable that so-called backcoat is applied on the surface which is opposite to the side of aforesaid support on which the magnetic layer is provided for the antistatic and transfer-prevention purposes.

As a coating method for forming the magnetic layer by coating aforesaid magnetic coating on the support, air doctor coating, blade coating, air knife coating, squeeze coating, impregnation coating, reverse roll coating, transfer roll coating, gravure coating, kiss coating, cast coating and spray coating may be used and the methods other than the foregoing are also available.

The magnetic layer coated and formed on the support through the aforesaid method is dried after the processing for the orientation of magnetic powder in the layer that is taken when necessary.

Further, by giving a calendering treatment when necessary, or by cutting or slitting in a desired form, the magnetic recording media are manufactured.

EXAMPLE

The present invention will be explained referring to the examples to which the invention is not limited.

Examples 1~2

Surface-treated magnetic metal powder A (BET method specific surface area 40 m$^2$/g, σs 120 emu/g, Hc 1470 Oe) . . . 100 parts
Estan 5701 (polyurethane made by B.F. Goodrich) . . . 6 parts
VAGH (vinyl chloride-vinyl acetate copolymer partially hydrolyzed made by UCC Companny) . . . 6 parts
Alumina . . . 5 parts
Lecithin . . . 5 parts
Lubricant mixture (See Table I)
Cyclohexanone . . . 200 parts
Methylethylketone . . . 50 parts
Toluene . . . 50 parts Above items were put in the ball mill and dispersed for 30 hours. Then, 5 parts of the hardening agent, tolylenediisocyanate adduct (Colonate-L: made by Nihon Polyurethane Company) were further added thereto and stirred and mixed for an hour and one-half. After that, the mixture was filtered through the 3 μm filter and coated on the polyester base having the thickness of 14 μm in a magnetic field of 2000 gauss being applied on the polyester base. After calendering, the base was slitted in ½-inch width, thus video tapes were prepared. The video tapes prepared were loaded in the VHS cassette and were subjected to the test of durability, still life, heat resistance and separating check. The coefficient of friction of the video tape was also measured.

Incedentally, the magnetic metal powder A was treated as follows.

Magnetic metal powder was suspended in the aqueous solution of copolymer consisting of monomer unit (A) which is two carboxyl groups of alkylene derived from maleic anhydride changed to quaternary ammonium salt and of monomer unit (B) consisting of diisobutylene and after being stirred, it was dried in the nitrogen atmosphere at 50° C. to become a sample. Polymers in the amount of 3 g against 100 g of magnetic powder were adsorbed.

Example 3

Video tapes were prepared in the same way as in Example 1 with the exception that PKHH (phenoxy resin made by Union Carbide Company) in the same amount as VAGH was used instead of VAGH.

Example 4

Video tapes were prepared in the same way as in Example 1 with the exception that the magnetic powder (B) whose particle surfaces were treated as follows was used instead of the magnetic metal powder in Example 1.

The magnetic metal powder was suspended in the toluene solution of

$C_{18}H_{37}NH(CH_2)_3NH_2 \cdot (C_{17}H_{33}COOH)_2$ and after being stirred, it was dried in a current of nitrogen at room temperature. Aforesaid compounds in the amount of 3% of the magnetic powder were adsorbed. (BET specific area: 45 m²/g, σs: 124 emu/g, Hc: 1530 Oe)

COMPARATIVE EXAMPLE 1

Video tapes were prepared in the same manner as in Example 1 with the exception that untreated powder was used instead of the magnetic powder whose particle surfaces were treated in Example 1.

COMPARATIVE EXAMPLE 2

Following composite was prepared.

untreated magnetic metal powder (σs: 125 emu/g, BET specific area: 45 m²/g, Hc: 1550 Oe) ... 100 parts
Estan 5701 (Polyurethane made by B.F. Goodrich) ... 11.7 parts
VMCH (vinyl chloride - vinyl acetate copolymer mae by Union Carbide Company) ... 10 parts
alumina ... 5 parts
carbon black ... 0.6 parts
butyl acetate ... 100 parts
methylisobutylketone ... 100 parts Above items were put in the ball mill and were subjected to the dispersion for 10 hours. After the dispersion, 1 part of oleic acid, 1.67 parts of palmitic acid and 0.33 parts of amyl steprate were added thereto and then kneaded for another 15~30 minutes. Further, 7 parts of hardening agent, tolylenediisocyante adduct (Colonate-L: made by Nihon Polyurethane Company) were added thereto and stirred for 1 hour. After stirring, the mixture was filtered through the 3 μm filter and coated on the polyester base having the thickness of 14 μm in a magnetic field of 2000 gauss being applied on the polyester base. After calendering, the base was slitted in ½-inch width, thus video tapes were prepared.

COMPARATIVE EXAMPLE 3

Video tapes were prepared in the same way as in Example 1 with the exception that the lubricating composite tabulated in Table I was used instead of the lubricant in Example 1.

COMPARATIVE EXAMPLE 4

Video tapes were prepared in the same way as in Example 1 with the exception that the lubricating composite tabulated in Table 1 was used instead of the lubricant in Example 1.

COMPARATIVE EXAMPLE 5

Video tapes were prepared in the same way as in Example 1 with the exception that the lubricating composite tabulated in Table 1 was used instead of tne lubricant in Example 1.

COMPARATIVE EXAMPLE 6

Video tapes were prepared in the same way, as in Example 1 with the exception that the lubricating composite tabulated in Table 1 was used instead of the lubricant in Example 1.

Incidentally, aforesaid Comparative Example I and 2 represent the occasion where untreated magnetic powder and the lubricating composite of the present invention were used. while in the Comparative Example 3 and 4, treated magnetic powder A was used but the ratio of acid to ester is out of the present invention and Comparative Examples 5 and 6 represent the occasion where treated magnetic powder A was used but the total amount of acid and ester is out of the present invention.

TABLE 1

| | lubricant amount (%) | | | | | | |
|---|---|---|---|---|---|---|---|
| | fatty acid | | | fatty acid ester | | | |
| | oleic acid | myristic acid | palmitic acid | butyl palmitate | butyl- stearate | butoxyethyl palmitate | amyl stearate |
| | \multicolumn{3}{|}{number of carbon} | | | | |
| | 17 | 14 | 16 | 16 | 18 | 16 | 18 |
| | | | | melting point | | | |
| sample No. | (12) | (54) | (62) | (16) | (27) | (—) | (—) |
| Example | | | | | | | |

TABLE 1-continued

| | | lubricant amount (%) | | | | | |
|---|---|---|---|---|---|---|---|
| | | fatty acid | | | fatty acid ester | | |
| | | oleic acid | myristic acid | palmitic acid | butyl palmitate | butyl-stearate | butoxyethyl palmitate | amyl stearate |
| | | | | | number of carbon | | | |
| | | 17 | 14 | 16 | 16 | 18 | 16 | 18 |
| | | | | | | melting point | | |
| sample No. | | (12) | (54) | (62) | (16) | (27) | (—) | (—) |
| 1 | A | — | 3 | — | — | 0.5 | — | — |
| 2 | A | — | 4.5 | — | — | — | — | 0.5 |
| 3 | A | — | 3 | — | — | 0.5 | — | — |
| 4 | B | — | 3 | — | — | 0.5 | — | — |
| Comparative example | | | | | | | | |
| 1 | un-treated | — | 3 | — | — | 0.5 | — | — |
| 2 | un-treated | 1 | — | 1.67 | — | — | — | 0.33 |
| 3 | A | — | 2.1 | — | — | 1.4 | — | — |
| 4 | A | — | 3.5 | — | — | — | — | — |
| 5 | A | 0.5 | — | — | 0.5 | — | — | — |
| 6 | A | 4 | — | — | 4 | — | — | — |

Measurement items for characteristics and the measuring methods are as follows.

a. Durability

The sample tape whose length from the leading edge of the cassette is the length corresponding to 5 minutes period was tested for running 400 times repeatedly and an average of the test results for each item was obtained.

(1) edge damage ... visual check on the deformation of the edge.

(2) RF output drop ... RF output after the test was indicated with RF output before the test being 100%.

(3) powder falling ... Visual check on the amount of magnetic materials adhered on a cylinder and a head.

x: visible, Δ: slightly visible, o: little b. Heat resistance

The sample tape was taken up through the load of 1.5 kg on the glass tube that measured 35 mm in its diameter and was kept in the oven whose inside conditions were 45° C. and 80% for 4 hours and then was left for 24 hours at room temperature. After that, it was unrolled by the load of 1.5 g and was checked if there were any adhesion between layers.

x: adhesion, Δ: slightly adhesive, o: no adhesion c. Coefficient of friction

The coefficient of friction between the sample tape and a chromium pin having a diameter of 4 mm was measured on the tester for tape running characteristics (made by Yokohama System Company) at the tape running speed of 1.40 cm/sec.

d. Blooming

The surface of the sample tape was subjected to the visual check on the microscope with a magnification of 100 times.

Results of the measurement for characteristics are shown in Table II.

TABLE II

| | physical characteristics test | | | | | | | | | |
|---|---|---|---|---|---|---|---|---|---|---|
| | squareness ratio | orientation ratio | edge damage | RF output drop % | powder falling | blooming | still life min | heat resistance | coefficient of friction 4 mm chromium pin | video S/N dB |
| Example | | | | | | | | | | |
| 1 | 0.851 | 2.21 | no | 97 | o | no | 15 and over | o | 0.35 | 0 |
| 2 | 0.843 | 2.30 | " | 96 | o | " | 15 and over | o | 0.32 | +1.5 |
| 3 | 0.853 | 2.18 | " | 97 | o | " | 15 and over | o | 0.33 | +0.5 |
| 4 | 0.841 | 2.16 | " | 89 | o | " | 15 and over | o | 0.36 | 0 |
| Comparative Example | | | | | | | | | | |
| 1 | 0.791 | 1.90 | no | 73 | Δ | no | 5 | x | 0.33 | −2.5 |
| 2 | 0.788 | 1.88 | " | 70 | Δ | " | 6 | x | 0.35 | −2.0 |
| 3 | 0.821 | 1.99 | " | 85 | Δ ~ o | " | 7 | o ~ Δ | 0.39 | −1.5 |
| 4 | 0.811 | 1.98 | yes | 83 | Δ ~ x | " | 5 | o ~ Δ | 0.41 | 0 |
| 5 | 0.801 | 2.00 | yes | 77 | x | " | 2 | o | 0.45 | −3.0 |
| 6 | 0.850 | 2.25 | no | 75 | Δ ~ x | yes | 9 | x | 0.39 | 0 |

Following items are observed from Table II.

Durability test

Comparative Examples show that they have a high degree of powder falling and they are inferior in durability. They also tend to have edge damage.

2. Still life

A still life is short for Comparative Examples 1 and 2 becomes magnetic powder with surface treatment is not used in them. Still lives of Comparative Examples 3 and 4 are short because the fatty acid/ester ratios in them are ot of the present invention. Comparative Examples 5 and 6 also have a shorter still life because the amount of acid and ester added is out of the present invention.

3. Heat resistance

Comparative Examples 1,2 and 6 showed an adhesion.

4. Squareness ratio, orientation ratio

When the metallic powder with surface treatment is used, the squareness ratio and the orientation ratio are high.

5. Blooming

When the amount of lubricant to be added as increased up to 8%, blooming took place.

6. Coefficient of friction

The values of coefficient of friction for Comparative Examples 3 and 4 are high because the fatty acid/fatty acid ester ratio for them is out of the range of the present invention. Comparative Examples 5 and 6 also have a high value of coefficient of friction because the total amount of acid and ester for them is out of the range of the present invention.

7. Video S/N

Video S/N ratios for comparative examples are within the range of 0~3.0, which is not satisfactory.

What is claimed is:

1. A magnetic recording medium comprising a magnetic recording layer and a support wherein said magnetic recording layer contains a magnetic metal powder, a fatty acid and an ester thereof, and wherein the surface of said magnetic powder is pre-treated with a surfactant, the total amount of said fatty acid and said ester being in the range of 1.5% to 7.5% by weight of said magnetic metal powder, and the weight ratio of said fatty acid to said ester being from 85/15 to 99/1.

2. The magnetic recording medium of claim 1, wherein said surfactant is selected from the group consisting of lechithin, phosphoric ester, amine compound, alkyl sulfate, fatty acid amide, higher alcohol, polyethylene oxide, succinic acid, sulfosuccinate, polymers having an anionic group or salts thereof and silicone compound.

3. The magnetic recording medium of claim 2, wherein said surfactant is a copolymer containing a monomer unit having an anionic organic group or salt thereof and the other monomer unit.

4. The magnetic recording medium of claim 2, wherein the amount of said surfactant is in the range of 0.5% to 5% by weight of said magnetic metal powder.

5. The magnetic recording medium of claim 2, wherein said fatty acid is selected from the group consisting of stearic acid, lauric acid, caprylic acid, oleic acid, linolic acid, linolenic acid, myristic acid, palmitic acid and behenic acid.

6. The magnetic recording medium of claim 5, wherein said ester is selected from the group consisting of methyl esters ethyl esters, propyl esters, butyl esters, amyl esters and butoxyethyl esters of said fatty acids.

7. The magnetic recording medium of claim 1, wherein said magnetic metal powder is selected from the group consisting of Fe, Ni, Co, Fe-Ni-Co alloy, Fe-Mn-Zn alloy, Fe-Ni-Zn alloy, Fe-Al alloy, Fe-Co-Ni-Cr alloy, Fe-Co-Ni-P alloy and Co-Ni alloy.

8. The magnetic recording medium of claim 1, wherein said magnetic metal powder is pre-treated by the process which includes adding said magnetic metal powder into a solution consisting essentially of a solvent and said surfactant dissolved therein, stirring and dispersing.

9. The magnetic recording medium of claim 1, wherein said magnetic recording layer contains a polyurethane resin and a isocyanate.

10. The magnetic recording medium of claim 9, wherein said magnetic recording layer further contains a cellulose resin and/or a vinyl chloride copolymer.

11. The magnetic recording medium of claim 1, wherein said medium has a backing-coat layer.

12. The magnetic recording medium of claim 1, wherein said magnetic recording layer contains a phenoxy resin.

13. The magnetic recording medium of claim 1 wherein the weight ratio of said fatty acid to said ester is from 85/15 to 95/5.

* * * * *